United States Patent
McIntosh et al.

(10) Patent No.: US 9,187,967 B2
(45) Date of Patent: Nov. 17, 2015

(54) FLUID SAFETY VALVE

(75) Inventors: Richard McIntosh, Lafayette, LA (US);
Toby Scott Baudoin, Rayne, LA (US)

(73) Assignee: 2M-TEK, Inc., Scott, LA (US)

( * ) Notice: Subject to any disclaimer, the term of this patent is extended or adjusted under 35 U.S.C. 154(b) by 830 days.

(21) Appl. No.: 13/326,061

(22) Filed: Dec. 14, 2011

(65) Prior Publication Data
US 2013/0153239 A1    Jun. 20, 2013

(51) Int. Cl.
*E21B 34/08* (2006.01)
*E21B 21/10* (2006.01)
*F16K 17/04* (2006.01)

(52) U.S. Cl.
CPC .............. *E21B 21/106* (2013.01); *F16K 17/044* (2013.01); *F16K 17/048* (2013.01)

(58) Field of Classification Search
USPC .................... 166/373, 386, 319, 320, 321; 137/493.9, 493
See application file for complete search history.

(56) References Cited

U.S. PATENT DOCUMENTS

| | | | |
|---|---|---|---|
| 3,385,370 A * | 5/1968 | Knox et al. .................. 166/317 |
| 4,364,407 A | 12/1982 | Hilliard |
| 4,658,905 A | 4/1987 | Burge |
| 5,479,988 A * | 1/1996 | Appleton .................... 166/325 |
| 5,704,393 A | 1/1998 | Connell et al. |
| 5,971,079 A | 10/1999 | Mullins |
| 6,173,777 B1 | 1/2001 | Mullins |
| 6,237,632 B1 | 5/2001 | Smith, III |
| 6,290,267 B1 | 9/2001 | Swingley |
| 6,571,876 B2 | 6/2003 | Szarka |
| 6,666,273 B2 * | 12/2003 | Laurel ......................... 166/382 |
| 6,830,064 B2 | 12/2004 | Ji |
| 6,832,656 B2 | 12/2004 | Fournier |
| 7,048,079 B1 | 5/2006 | Parker |
| 7,100,693 B2 * | 9/2006 | Collins et al. .............. 166/308.1 |
| 7,578,378 B2 | 8/2009 | Gebert et al. |
| 7,637,324 B2 | 12/2009 | Anderson et al. |
| 7,743,787 B2 | 6/2010 | Baugh |
| 8,327,867 B2 | 12/2012 | Caleffi |
| 8,689,828 B2 | 4/2014 | Smith, III |
| 2001/0032675 A1 | 10/2001 | Russell |
| 2009/0229837 A1 * | 9/2009 | Wiens et al. .................. 166/381 |
| 2009/0235994 A1 | 9/2009 | Lubinski et al. |
| 2011/0036586 A1 | 2/2011 | Hart |
| 2011/0192649 A1 | 8/2011 | Mohon et al. |
| 2011/0240299 A1 | 10/2011 | Vick, Jr. et al. |
| 2014/0008556 A1 | 1/2014 | Ewers et al. |

FOREIGN PATENT DOCUMENTS

IN    3307/KOLNP/2012    6/2013

* cited by examiner

*Primary Examiner* — William P Neuder
(74) *Attorney, Agent, or Firm* — Andrews Kurth LLP

(57) ABSTRACT

A bi-directional fluid safety valve for preventing spillage when filling tanks, vessels, fill lines, and or hoses for transportation of fluids in pipelines or tubulars with a tubular body with an external body and an internal bore having a fluid flow path from a first end to a second end, the first and second members concentrically disposed and moveable along a longitudinal axis within the tubular body; with means such as springs to longitudinally bias the first member toward the second member and means to longitudinally bias said second member toward said first member. Also provided are embodiments for connection of the tubular body to alternative connection systems.

29 Claims, 4 Drawing Sheets

FLUID SAFETY VALVE

FIELD OF THE INVENTION

The present invention relates generally to valves and more specifically to valves for preventing spillage when filling tanks, vessels, fill lines, and or hoses for transportation of fluids in pipelines or oil country tubular goods OCTG). The present invention also relates to an apparatus and a method used in the completion of an oil, gas or geothermal well bore. More particularly, the invention relates to a tubular (OCTG) fill-up and circulating tool. More particularly still, the present invention relates to a "Fluid Safety Valve" that can be inserted into a tubular (OCTG), can also be attached to a Kelly or top-drive, fluid or gas containment tank, vessel, fill lines and or hoses for the transportation of fluids, including but not limited to a fill-up and or circulating tool.

DESCRIPTION OF THE RELATED ART

In the drilling of oil, gas or geothermal well, a wellbore is formed using a drill bit that is urged downwardly at the lower end of a drill string. After drilling the wellbore to a predetermined depth, the drill string and bit are removed. Thereafter, the wellbore is typically lined with a string of steel pipe called a tubular (OCTG). The tubular (OCTG) provides support to the wellbore and facilitates the isolation of certain areas of the wellbore adjacent hydrocarbon bearing formations.

During the run-in of a tubular (OCTG) string, the tubular (OCTG) string is typically filled with mud. The primary reason to fill the tubular (OCTG) string with drilling mud or fluid is to prevent the new tubular (OCTG) from collapsing due to the pressure imbalances between the inside of the tubular (OCTG) and the wellbore fluid there around and avoidance of buoyancy. Typically, the filling process occurs as the tubular (OCTG) string is assembled at the rig floor. A secondary reason to fill the tubular (OCTG) string with drilling mud or fluid is to use the drilling mud or fluid to free tubular (OCTG) string when the tubular (OCTG) becomes stuck during the run-in operation. In this situation, the drilling operator circulates drilling mud or fluid down the tubular (OCTG) to wash sand or other debris from the lowermost end of the tubular (OCTG), thereby freeing the stuck tubular (OCTG).

Typically, a fill-up and circulating tool is used in conjunction with a mud pump to fill and circulate the mud in the tubular (OCTG). An example of a fill-up and circulating tool is described in U.S. Pat. No. 6,173,777 and U.S. Pat. No. 6,832,656 B2.

Generally, the mud pump is turned off while the fill-up and circulating tool is still in the tubular (OCTG), thereby allowing all the mud in the mud pump and the connecting hose to flow through the tool into the tubular (OCTG). However, a problem associated with the above referenced fill-up and circulating tool arises when the tool is suddenly or accidentally removed from the tubular (OCTG) prior to shutting down of a mud pump. In this situation, a pressure surge is created in the tool due to the closed valve, thereby causing the mud pump to stop. This pressure surge may cause catastrophic failure of the mud pump or other hydraulic components. Another problem arises after the tubular (OCTG) is filled with mud. Typically, the tool is pulled out of the tubular (OCTG) and the valve arm drops down to close the valve member. However, if the mud pump is not properly turned off to allow the mud in the connecting hose to exit the tool prior to removal of the tool from the tubular (OCTG), the volume of mud continues to enter the tool. Because the valve member is closed, the mud is prevented from exiting the tool. As a result, the pressure in the tool may become so large as to cause the hose to burst, thereby causing damage to the equipment or injury to personnel on the rig floor.

It is also the case today that when flowing fluids into or out of, to or from a tank or vessel or standing open pit you cannot simply allow the gases or fluids to vent into the atmosphere as the resultant fumes or fluids could be toxic to animals or humans. They could also cause or pose an environmental concern or seepage into the ground. It would therefore be necessary or precautionary to interconnect one or more tanks, vessels or compartments to allow a collective combination of fluid or gas mixtures to be collected and stored. While a secondary means of identifying the amount of fluid or gas is present in a tank would be to deploy a monitoring device, however monitoring or sounding an alarm may not prevent an over pressure situation and or resultant catastrophic failure to occur. In the case of a well bore in an oil, gas or geothermal well should the drilling rig operations encounter an unexpected pocket of gas down hole and take an exceptional return of fluids to surface, monitoring the fluid containment in a tank alone could still lead to an over-pressurization situation. Deployment of a device such as is embodied in this present invention would alleviate the situation by automatically opening or closing the fluid safety valve as required depending on the situation or closure of the valve whilst aligning a secondary tank, vessel or pipeline for the fluid containment.

There is a need, therefore, for a valve that will prevent a pressure surge in the mud system when the tool is accidentally removed from the tubular (OCTG). There is a further need for a valve that will permit a volume of drilling mud or fluids in the tank, vessel or hose to exit the system even though the valve is closed. There is yet a further need for a more reliable fill-up, circulating or pressure relieving tool or apparatus.

BACKGROUND OF THE INVENTION

In the world that we live in today, safety and environmental issues are of paramount importance. During filling operations of tanks, vessels, fill lines, hoses, pipelines or tubulars for transportation of fluids that are harmful to personnel or the environment, it is necessary to use a valve which precludes spillage when the hose or transportation device is disconnected from the structure being filled. These valves must also allow fluid to flow in the reverse direction to prevent over pressuring. For these reasons, these types of valves are generally referred to as fluid safety valves or pressure relieving valves.

In one application the filling and or circulation operations of tubulars (OCTG) used primarily for the drilling and completing of oil and gas or geothermal wells, where it is necessary to run or pull tubulars (OCTG) into or out of a wellbore. When running tubulars into or out of the wellbore, it is common to fill each joint with drilling or wellbore fluid (also known as drilling mud). The drilling or wellbore fluid is a mixture of various chemicals required to support varying operations or conditions which often contain elements of a high viscous nature. When introduced to valves or restrictions, the drilling or wellbore fluid can be highly corrosive or abrasive especially when transported or delivered under pressure. A valve is normally installed below the Kelly or top drive to prevent the discharge of the drilling or wellbore fluid from spilling onto the rig floor where it is a hazard to personnel and the environment. These valves allow drilling or wellbore fluid to flow into the tubular (OCTG) while pumping but will automatically close when pumping is discontinued. These types of valves are known as "Standing or Mud Saver Valves". There are numerous prior art patents for these types of valves.

These prior art designs generally include a closure member, an abutting seat member, and a means for urging the closure member toward the seat. The prior art also tended to have no matched flow capability in opposing directions, bi-directional reverse flow capability, and a restricted or reduced flow through bore and could only be used in a vertical application.

Each of the prior art valves disclose many advantages and enhancements in safety and or valve designs. However, each of the valves has certain shortcomings. The main shortcoming being the lack of a matched full flow through the valve cavity, pressure balancing, bi-directional capability and no restrictions on plane of operation.

A second shortcoming is the lack of wear resistance. Many drilling or wellbore fluids, especially those used in drilling applications, contain elements of a high viscous nature and high solids content. These solids can be sand, barite, and a variety of other chemical materials used to create higher density fluids. These types of fluids can be very abrasive and therefore erosive. Prior art designs contain sharp edges, irregular or nonlinear flow paths, small cross sectional flow areas, or all of the aforementioned, causing turbulence within the valve. The combination of these factors leads to premature wear and ultimately failure.

A third disadvantage to prior art designs is that the seat is held rigid as it is encountered by the closure member when the valve closes. This rigidity can cause a violent impact between the closure member and the seat. These impacts cause severe wear to the sealing surfaces leading to a possible catastrophic failure of the valve.

A fourth disadvantage to prior art designs is the closure member does not have a mechanical means to limit its axial movement. This creates two problems. First, the spring urging the closure member towards the abutting seat can be compressed further than the spring manufacturer's recommended deflection, overstressing the spring, causing it to fail. Secondly, the lack of a limiting means causes chattering of the closure member against the seat, thereby causing premature failure wear. This is due to the pump pressure forces being constantly resisted by the spring. As the pump pressure fluctuates, the closure member correspondingly moves closer to and away from the seat. When the pump pressures and or flow rates are such that these fluctuations occur while the closure member is very close to the seat, chattering occurs. This chattering effect is detrimental to the sealing surfaces and can lead to catastrophic failure of the valve.

A fifth disadvantage to prior art designs is the lack of ability to have a full flow capability in reverse flow or the cross sectional area for reverse flow is very small. These restricted fluid flow passages increase the amount of time necessary to relieve the pressure built up or trapped and again lead to catastrophic failure of the valve, tank or containment vessel.

A sixth disadvantage to prior art designs is the absence of a means to adjust to pressures or flow rates at which the valve opens in both directions. Many valves use a ball type check for reverse flow that relies on gravity to hold it firmly against its seat. This provides no means of adjusting the pressure at which the check opens. It also will not function in orientation other than vertical.

A seventh disadvantage to prior art designs is the chamber or cross sectional space housing the closure member spring is not sealed from the fluids being circulated. The circulation of fluids laden with sand or other solids can cause build up of these solids around the coils of the spring. This can reduce the deflection of the spring causing the flow area between the closure element and the seat to become restricted. This build up can also completely eliminate the spring deflection blocking all flow through the valve and can lead to potential catastrophic failure of the valve or associated equipment.

SUMMARY OF THE INVENTION

A valve for safely filling tanks, vessels, or tubulars is disclosed remediating the foregoing disadvantages. The valve opens to permit the flow of fluids upon activation of the pump and closes automatically upon ceasing pumping to prevent drainage. It also allows fluid to flow in the reverse direction to relieve any pressure that may be contained in the tank, vessel, or tubular. The valve is pressure activated by engaging the pump to overcome a spring bias to enable flow in the forward direction. The valve also permits reverse flow by also overcoming a predetermined spring bias.

It is an object of the present invention to provide a valve to be used below a top drive to permit forward and reverse fluid flow into or out of a well bore while the top drive, or associated piping is connected to the drill string and to prevent spillage onto the rig floor when the top drive is disconnected from the drill string.

It is another object of the present invention to provide a valve to be used in filling and or circulating tubulars (OCTG) while it is rm into a wellbore which permits forward and reverse fluid flow while the top drive, a casing running tool (CRT), or associated fill-up and circulating tools or piping are directly or indirectly connected to the tubular (OCTG) while preventing spillage onto the rig floor when the top drive, casing running tool, or associated piping is disconnected from the tubular (OCTG).

It is also an object of the present invention to provide a valve to be used as a fill up and circulating tool for the running of tubulars (OCTG) into or out of a surface or sub-sea wellbores.

It is also an object of the present invention to provide a valve to be used while filling tanks, vessels, fill hoses, piping or pipelines.

DETAILED DESCRIPTION OF THE INVENTION

Figure 1:
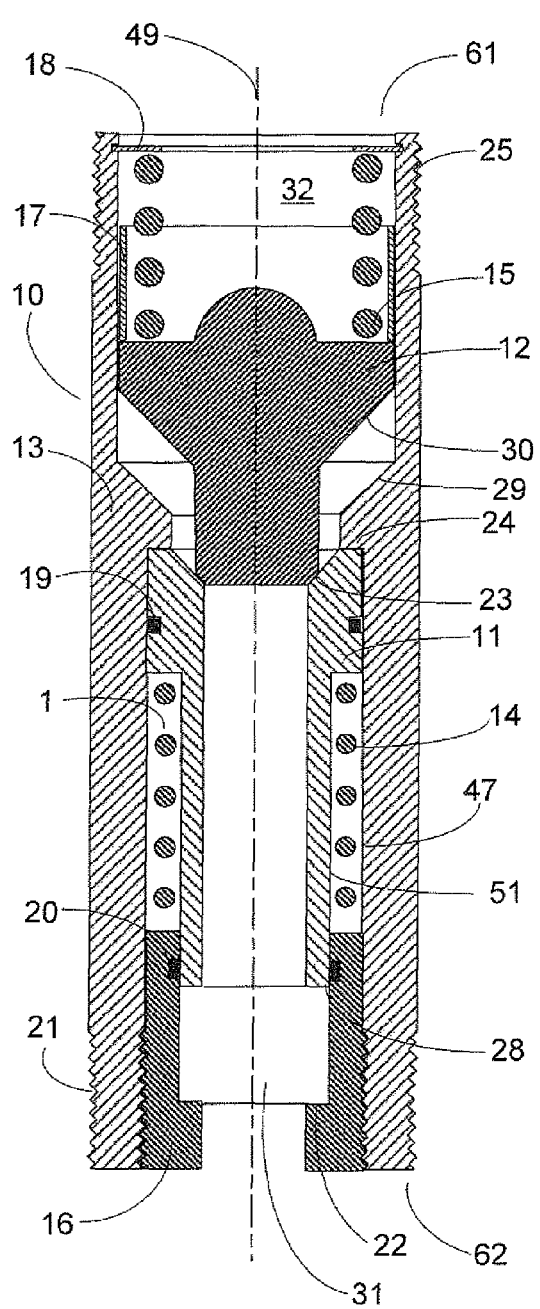
FIG. 1 is a longitudinal cross sectional view of a first embodiment of the invention shown in the closed position.

FIG. 1 illustrates a first embodiment of inventive valve 10 which has an external tubular body 13 with an internal bore 32 or flow path, having a first end 61 and a second end 62.

Internal bore 32 allows fluids to transfer from a pump to the structure being filled. As fluid is being pumped in a forward direction as illustrated by lines 27 on FIG. 2, it encounters a first member 12, hereinafter referred to as a poppet. Poppet 12 is concentrically located within the tubular body 13 and shares the same central axis 49 with a second element 11, hereinafter referred to as a closure element, making poppet 12 and closure element 11 concentric with one another. As the fluid passes poppet 12, it encounters closure element 11. Closure element 11 is urged longitudinally toward poppet 12 via closure element spring 14, thereby resisting movement until such time as the differential pressure of the fluid exceeds the spring force of the closure element spring 14. Poppet 12 is urged longitudinally toward the closure element 11 via poppet spring 15. Closure element 11 and poppet 12 are permitted to travel independently of one another along their central axis 49. Closure element 11 and poppet 12 abut at 23. Closure element 11 is sealed to the internal bore surface 47 of body 13 via sealing element 19. Sealing element 20 forms a seal between the closure element limiting structure 16 and the outside diameter 51 of closure element 11. Poppet spring 15 is held in place via retaining device 18. Retaining device 18 is illustrated as a snap ring. Retaining device 18 may be of various forms such as threaded sleeves, press fit sleeves, etc. It must be noted that due to the design of this inventive valve, fluid is allowed to flow in both directions. This feature makes the inventive valve bi-directional.

The spring rates of poppet springs 15 and closure element spring 14 are selected to permit the inventive valve to open at predetermined differential pressures. These spring rates can be selected to open the inventive valve in the forward and reverse directions at the same or different differential pressures.

Figure 2:
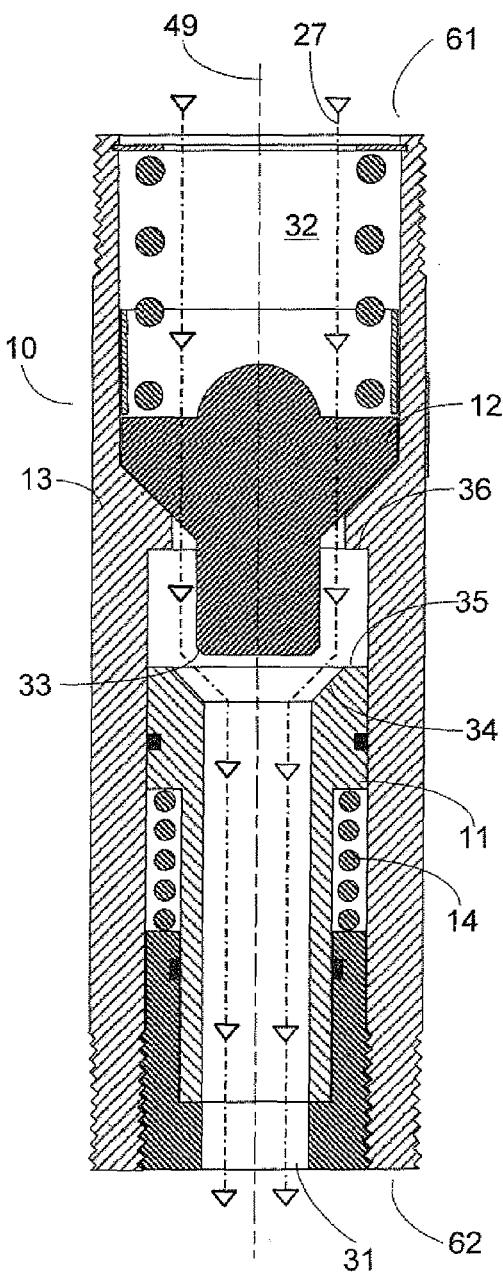
FIG. 2 is a longitudinal cross sectional view of a first embodiment of the invention shown in the open position by fluid flow in the forward direction.

Threaded area 25 and threaded area 21 are provided as a means to connect the inventive valve 10 to a tank, vessel, fill line, hose, pipeline or tubular. Threaded areas 21 and 25 are merely as illustration as many other connection means may be used. Other connection means include couplers, cam-lock couplers, quick connects, clamps, barbed, unions, "WECO®" or "Hammer" unions, or many others as commonly used in industry. These various connection means may be integral to or in conjunction with external tubular body 13. It must be noted that the inventive valve 10 may be used in either direction based on the application. The inventive valve is self contained, sealed and can also be installed in-line as illustrated in the drawings by various means of connection including but not limited to threaded connections, swage type connections, cross-overs or containment within a separate body integral or independent of a tubular (OCTG). Similarly the inventive valve could be used for surface operations or downhole applications FIG. 2 is an illustration of a first embodiment of the inventive valve 10 in the opened position due to forward flow 27. In this position, the poppet 12 and closure element 11 have travelled in the direction of flow 27. The poppet 12 travels until surface 30 of poppet 12 comes into contact with shoulder 29 of body 13. The closure element 11 travels until surface 28 of closure element 11 comes into contact with surface 22 of closure element limiting structure 16. In this position, clearance is provided between surface 33 of poppet 12 and surface 34 closure element 11, thereby permitting fluid to flow 27 between the poppet 12 and closure element 11. The fluid then exits apparatus at bore 31. The travel of closure element 11 is limited such that closure element spring 14 remains within the spring manufacturer's recommended maximum deflection values. This feature prevents the closure spring 14 from becoming overstressed and permanently setting or ultimately failing the spring 14. It will be observed that the closure element 11 will return towards the poppet 12 once the pump is disengaged. This is due to the closure element spring 14 biasing the closure element 11 towards poppet 12. Springs are the preferred means of biasing the both the poppet 12 and the closure element 11 towards one another, but other means for exerting a force may be used. It must be noted that the velocity of the closure element 11 will be slowed by poppet 12 while returning to the position as illustrated in FIG. 1. This slowing effect is due to the poppet spring 15 biasing the poppet 12 toward closure element 11. This slowing effect removes the abrupt impact due to the rigidity as in prior art designs. This unique feature significantly reduces the wear on surface 33 of the poppet 12 and surface 34 of the closure element 11, thereby vastly increasing the longevity and reliability of the inventive valve.

Referring to FIG. 2 the surface 35 of the closure element 11 and surface 36 of body 13 are illustrated in FIG. 2 as flat shoulders, but may however be tapered or radiused to reduce the internal fluid turbulence. The same holds true for surface 28 of closure element 11 and surface 22 of closure element limiting device 16 as well as surface 30 of poppet 12 and surface 29 of housing 13 as shown in FIG. 1. All internal edges, lines, tapers, etc. may be rounded or made more gradual to reduce the turbulence within the inventive valve. The edges or shoulders illustrated in FIG. 1 through FIG. 9 are merely shown for clarity and understanding of the figures presented. The edges or shoulders illustrated in FIG. 1 through FIG. 9 are also shown to display the function and features of the inventive valve.

Figures 3, 4:
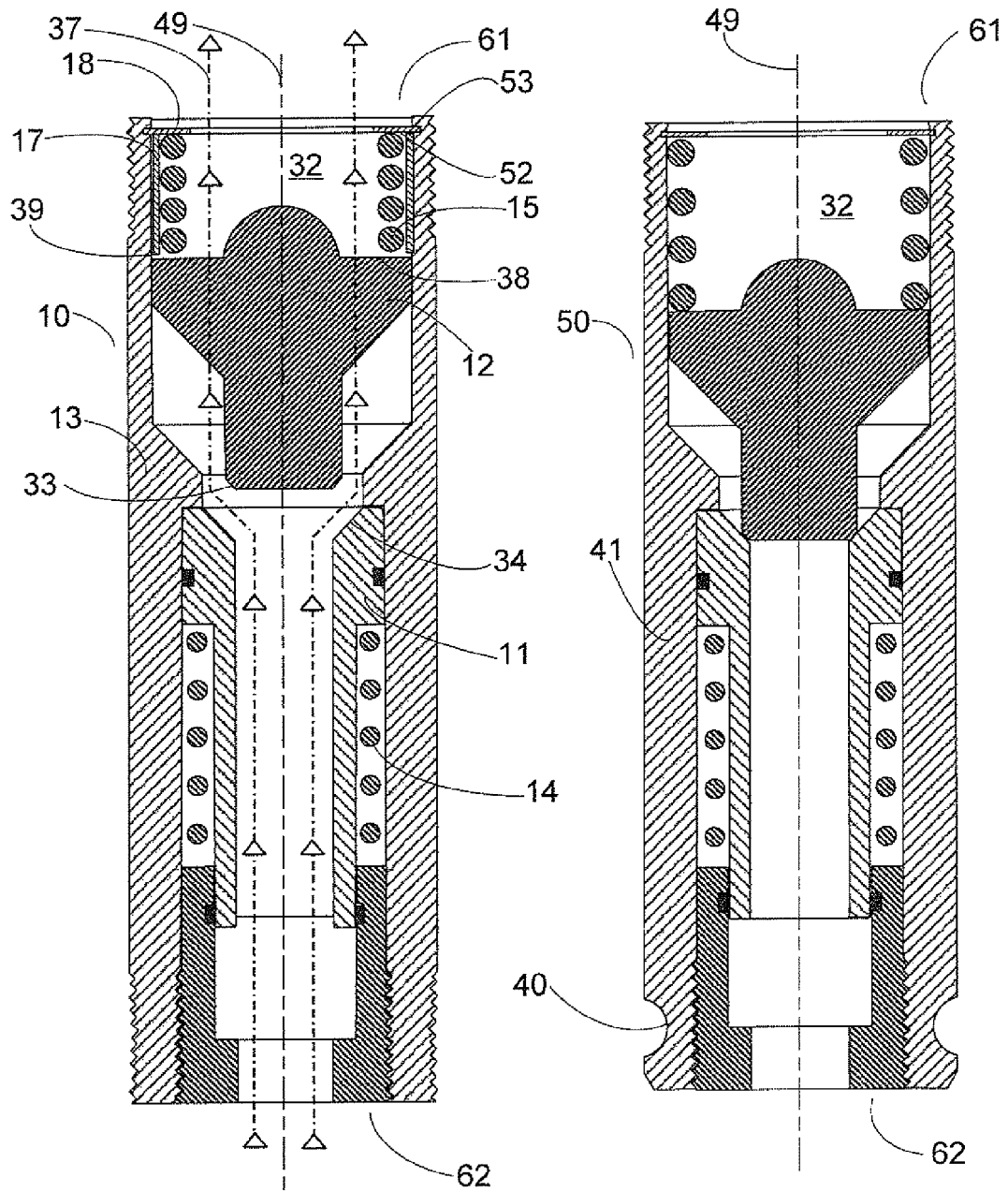
FIG. 3 is a longitudinal cross sectional view of a first embodiment of the invention shown in the open position by fluid flow in the reverse direction.
FIG. 4 is a longitudinal cross sectional view of a second embodiment of the invention shown in the closed position.

FIG. 3 is an illustration of a first embodiment of the inventive valve 10 in the open position due to reverse flow 37. In this position, the poppet 12 has travelled in the direction of flow 37. The poppet 12 travels until surface 38 of poppet 12 comes into contact with surface 39 of poppet spring limiting device 18 and surface 52 of poppet spring limiting device contacts surface 53 of retaining device 18. In this position, clearance is provided between surface 33 of poppet 12 and surface 34 closure element 11, thereby permitting fluid to flow between the poppet 12 and closure element 11. The fluid then exits the inventive valve at bore 32. The travel of poppet 12 is limited such that poppet spring 15 remains within the spring manufacturer's recommended maximum deflection values. This feature prevents the poppet spring 15 from becoming overstressed and permanently setting or ultimately failing the spring. It will be observed that the poppet 12 will return towards the closure element 11 once the pump is disengaged. It must be noted that the impact generated when surface 33 of poppet 12 contacts surface 34 of the closure element 11 will be softened by closure element spring 14. This cushioning effect significantly reduces the wear on surface 33 of the poppet 12 and surface 34 of the closure element 11, thereby vastly increasing the longevity and reliability of the inventive valve.

FIG. 4 is an illustration of a second embodiment of the inventive valve 50 that utilizes a male coupling feature 40 located on housing 41 to facilitate the easy on and off connection of a coupler, commonplace in industry, such as a cam-lock type coupler.

Figure 5:
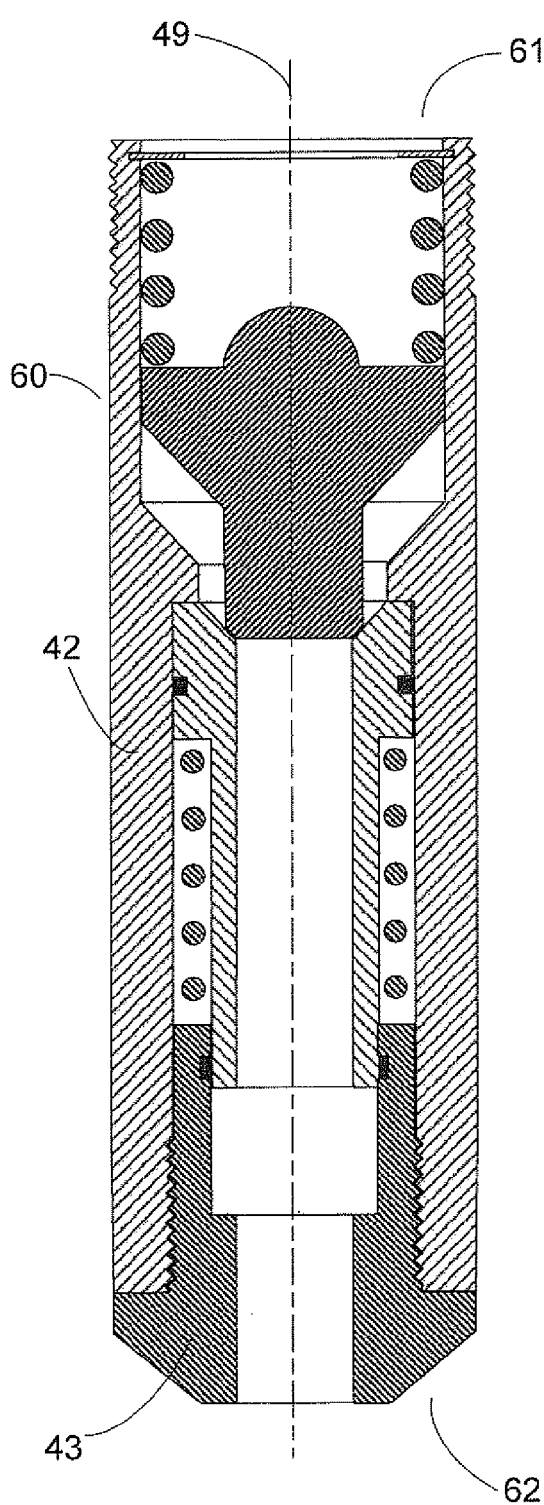
FIG. 5 is a longitudinal cross sectional view of a third embodiment of the invention shown in the closed position.

FIG. 5 is an illustration of a third embodiment of the inventive valve 60 that utilizes a bull-nose feature on closure element limiting device 43 to facilitate the easy insertion of the apparatus into an opening of a tank, vessel, tubular, etc.

Figure 6:
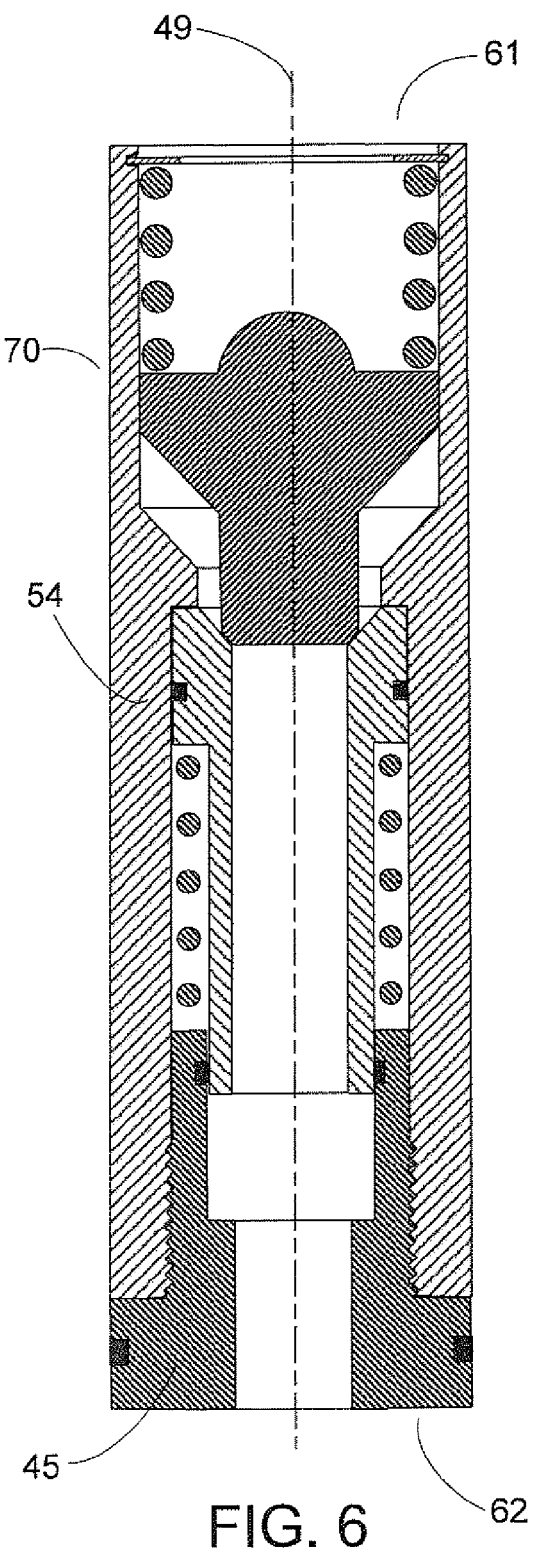
FIG. 6 is a longitudinal cross sectional view of a fourth embodiment of the invention shown in the closed position.

FIG. 6 is an illustration of a fourth embodiment of the inventive valve 70 that is designed as a self contained cartridge. This self contained inventive valve 70 may be inserted into a housing, tubular, pipe, pipeline, casing, sub, or any fluid flow transportation system or device.

Figure 7:
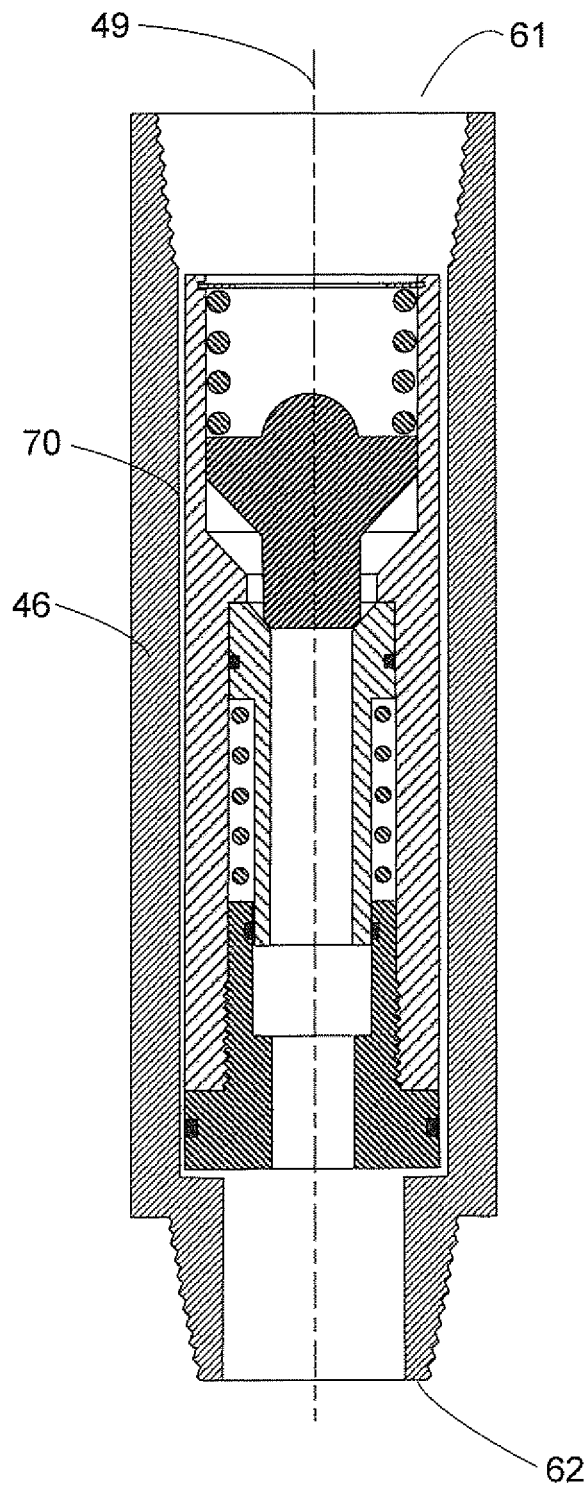
FIG. 7 is a longitudinal cross sectional view of the fourth embodiment of the invention shown in the closed position mounted within a housing.

FIG. 7 is an illustration of the inventive valve 70 as described in FIG. 6 mounted within housing 46. It must be noted that the illustration of the housing is merely to serve as one example of the many mounting possibilities. It must also be noted that the orientation of the inventive valve 70 within housing 46 may be reversed.

Figure 8:
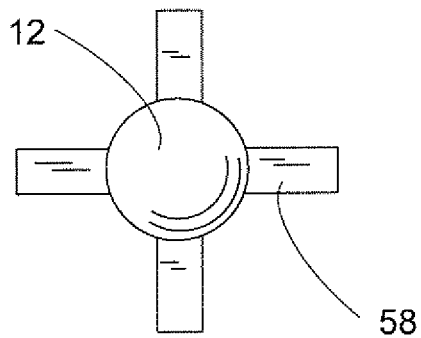
FIG. 8 is a top view of an embodiment of the poppet of the invention.

FIG. 8 is a top view of poppet 12 illustrating the vane features 58. It must be noted that four vanes 58 are shown but only two are required. Therefore, poppet 12 may contain two or more vanes 58.

Figure 9:
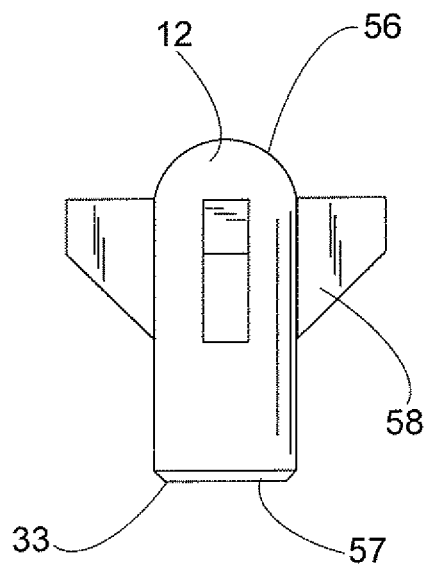
FIG. 9 is a side elevation view of an embodiment of the poppet of the invention.

FIG. 9 is a side elevation view of poppet 12 illustrating one embodiment. This embodiment includes a spherical or domed shape feature 56 on one end and a flat surface 57 on the other. The flat surface 57 may be of the same or different profile as that of surface 56. Surface 33 is illustrated as a chamfer or conical surface, but may be of different profiles. Surface 33 may be spherical or domed shape, flat, or a variety of other profiles. Surface 33 may be coated with a wear resistant material or may have a wear resistant material such as carbide imbedded in or mounted to this surface. Likewise, as shown in FIG. 2, surface 34 of closure element 11 may also be coated with a wear resistant material or may have a wear resistant material such as carbide imbedded in or mounted to this surface. Surface 34 of closure element 11 is illustrated as a chamfer or conical profile but may too be flat, spherical, domed shaped, etc.

What is claimed is:

1. A fluid safety valve for surface operations including top-drive operations, the fluid safety valve comprising:
   a tubular body having a longitudinal axis with a first end and a second end, with an external body and an internal bore serving as a fluid flow path therethrough from the first end to the second end;
   a poppet and a closure element concentrically disposed and moveable along the longitudinal axis within said tubular body where the internal bore has a shoulder to halt longitudinal movement of the poppet and the internal bore has a shoulder to halt longitudinal movement of the closure element;
   an element to longitudinally bias the poppet toward said closure element;
   an element to longitudinally bias said closure element toward said poppet where the fluid flow path is closed when the poppet and closure element are in contact, and the fluid flow path is open when the poppet and closure element are separated.

2. The fluid safety valve of claim 1 wherein fluid flowing from said first end to said second end urges both the poppet and closure element in the direction of flow.

3. The fluid safety valve of claim 2 wherein as the rate of fluid flowing increases, the poppet and closure element continue to move in the direction of flow until the poppet encounters the shoulder on the internal bore of said tubular body halting the longitudinal movement of the poppet.

4. The fluid safety valve of claim 3 wherein as the rate of fluid flowing continues to increase, the closure element continues to move in the direction of said flow until the closure element encounters the shoulder within the internal bore of said tubular body halting the longitudinal movement of the closure element.

5. The fluid safety valve of claim 4 wherein fluid flow is allowed to travel through the fluid flow path in the internal bore and between the poppet and the closure element and permitted to exit the fluid safety valve at the second end.

6. The fluid safety valve of claim 5 wherein once the fluid flow is ceased or reduced below a predetermined value, the closure element returns towards said first end and encounters the poppet.

7. The fluid safety valve of claim 6 wherein the velocity of the closure element is slowed by the poppet.

8. The fluid safety valve of claim 1 wherein fluid flowing from said second end to said first end urges only the poppet in the direction of flow.

9. The fluid safety valve of claim 8 wherein as the fluid flow rate increases, the poppet continues to move in the direction of flow until the poppet encounters a retaining device within the internal bore of said tubular body halting the movement of the poppet.

10. The fluid safety valve of claim 9 wherein fluid flow is allowed to travel through the fluid flow path in the internal bore and between the poppet and the closure element and permitted to exit the fluid safety valve at the first end.

11. The fluid safety valve of claim 1 wherein flow is permitted in both directions.

12. The fluid safety valve of claim 11 wherein the volume of fluid permitted in one direction will not be less than the volume of fluid permitted in the reverse direction.

13. The fluid safety valve of claim 1 wherein the element to longitudinally bias the poppet toward the closure element is predetermined.

14. The fluid safety valve of claim 1 wherein the element to longitudinally bias the closure element toward the poppet is predetermined.

15. The fluid safety valve of claim 1 wherein the element to longitudinally bias the poppet toward the closure element is of equal strength to the element to longitudinally bias the closure element toward the poppet so that the fluid safety valve will open at the same differential pressures in forward or reverse flow.

16. The fluid safety valve of claim 1 wherein the element means to longitudinally bias the poppet toward the closure element is less strong than the element to longitudinally bias the closure element toward the poppet so that the fluid safety valve will open at higher differential pressures in forward flow.

17. The fluid safety valve of claim 1 wherein the element to longitudinally bias the poppet toward the closure element is less strong than the element to longitudinally bias the closure element toward the poppet so that the fluid safety valve will open at higher differential pressures in reverse flow.

18. The fluid safety valve of claim 1 wherein the fluid safety valve is to be used as a mud saver valve for the running of tubulars or drill strings into or out of a wellbore.

19. A fluid safety valve for surface operations including top-drive operations, the fluid safety valve comprising:
   a tubular body having a longitudinal axis with a first end and a second end, with an external body and an internal bore serving as a fluid flow path therethrough from the first end to the second end;
   a poppet and a closure element concentrically disposed and moveable along the longitudinal axis within said tubular body where the internal bore has a shoulder to halt longitudinal movement of the poppet and the internal bore has a shoulder to halt longitudinal movement of the closure element;
   a first spring to longitudinally urge the poppet toward said closure element;
   a second spring to longitudinally urge said closure element toward said poppet where the fluid flow path is closed when the poppet and closure element are in contact, and the fluid flow path is open when the poppet and closure element, are separated.

20. A fluid safety valve for surface operations including top-drive operations, the fluid safety valve comprising:
a tubular body having a longitudinal axis with a first end and a second end, with an external body and an internal bore serving as a fluid flow path therethrough from the first end to the second end;
a poppet and a closure element concentrically disposed and moveable along the longitudinal axis within said tubular body where the internal bore has a shoulder to halt longitudinal movement of the poppet and the internal bore has a shoulder to halt longitudinal movement of the closure element;
an element to longitudinally bias the poppet toward said closure element;
an element to longitudinally bias said closure element toward said poppet where the fluid flow path is closed when the poppet and closure element are in contact, and the fluid flow path is open when the poppet and closure element are separated; and
wherein the volume of flow is substantially equal for flow from the first end to the second end or from the second end to the first end.

21. A fluid safety valve for surface operations including top-drive operations, the fluid safety valve comprising:
a tubular body having a longitudinal axis with a first end and a second end, with an external body and an internal bore serving as a fluid flow path therethrough from the first end to the second end;
a poppet and a closure element concentrically disposed and moveable along the longitudinal axis within said tubular body where the internal bore has a shoulder to halt longitudinal movement of the poppet and the internal bore has a shoulder to halt longitudinal movement of the closure element;
an element to longitudinally bias the poppet toward said closure element;
an element to longitudinally bias said closure element toward said poppet where the fluid flow path is closed when the poppet and closure element are in contact, and the fluid flow path is open when the poppet and closure element are separated; and;
a means is provided on the external body of said tubular body for connection with a mating fluid transportation system.

22. A fluid safety valve for surface operations including top-drive operations, the fluid safety valve comprising:
a tubular body having a longitudinal axis with a first end and a second end, with an external body and an internal bore serving as a fluid flow path therethrough from the first end to the second end;
a poppet and a closure element concentrically disposed and moveable along the longitudinal axis within said tubular body where the internal bore has a shoulder to halt longitudinal movement of the poppet and the internal bore has a shoulder to halt longitudinal movement of the closure element;
an element to longitudinally bias the poppet toward said closure element;
an element to longitudinally bias said closure element toward said poppet where the fluid flow path is closed when the poppet and closure element are in contact, and the fluid flow path is open when the poppet and closure element are separated; and;
a means is provided proximal both the first end and the second end of said tubular body for connection with a mating fluid transportation system.

23. The fluid safety valve of claim 22 wherein the said means for connection are threads.

24. The fluid safety valve of claim 22 wherein the said means for connection are male couplers.

25. The fluid safety valve of claim 22 wherein the means for connection proximal said first end is a thread and said means for connection proximal said second end is a male coupler.

26. The fluid safety valve of claim 22 wherein the said means for connection proximal said first end is a thread and said second end is provided with a bull-nose feature.

27. The fluid safety valve of claim 22 wherein the fluid safety valve can be used in-line with a fluid transportation system.

28. The fluid safety valve of claim 22 wherein the fluid safety valve is bi-directional and can be functioned in a horizontal or vertical orientation and can be transposed.

29. The fluid safety valve of claim 22 wherein the fluid safety valve can be utilized in any orientation or axial direction.

* * * * *